United States Patent [19]

Laurent

[11] 4,098,078
[45] Jul. 4, 1978

[54] PROCESS AND APPARATUS FOR AFTERBURNING OF COMBUSTIBLE POLLUTANTS FROM AN INTERNAL COMBUSTION ENGINE

[76] Inventor: Pierre Alfred Laurent, 62, Avenue Theophile Gautier, 75016 Paris, France

[21] Appl. No.: 758,558

[22] Filed: Jan. 11, 1977

Related U.S. Application Data

[63] Continuation of Ser. No. 496,017, Aug. 7, 1974, abandoned.

[30] Foreign Application Priority Data

Feb. 12, 1973 [FR] France .................. 73.04925
Aug. 10, 1973 [FR] France .................. 73 29322

[51] Int. Cl.² .................. F01N 3/10; F02B 75/10
[52] U.S. Cl. .................. 60/274; 60/290; 60/307
[58] Field of Search .................. 60/286, 274, 289, 290, 60/306, 307

[56] References Cited

U.S. PATENT DOCUMENTS

| 3,106,820 | 10/1963 | Schaffer | 60/290 |
|---|---|---|---|
| 3,203,168 | 8/1965 | Thomas | 60/286 |
| 3,785,152 | 1/1974 | Pozniak | 60/290 |
| 3,812,673 | 5/1974 | Muroki | 60/298 |
| 3,826,089 | 7/1974 | Nakajima | 60/290 |

*Primary Examiner*—Douglas Hart
*Attorney, Agent, or Firm*—Haseltine, Lake & Waters

[57] ABSTRACT

In a process for the afterburning of the combustible pollutants from an internal combustion engine, in order to automatically reduce the secondary induction rate when power increases without using a controlling valve actuated by the carburettor venturi depression, there is provided a volumetric efficiency of the secondary air pump linked to and activated by the engine and a volumetric efficiency which decreases when the ratio between its back pressure and suction pressure increases, this reduction being achieved through the proper selection of the pump volumetric comression ratio $r$: between $0.6\,c$ and $1.3\,c$ when a steeply decreasing trend is required, and above $1.3\,c$ if a slower and slower decreasing trend is required. To perform this process an afterburner apparatus has a nitrogen oxide reducing catalyst placed inside the afterburner reactor on the gas stream immediately at the outlet of a torus, in which the gases are homogenized and their reaction with preinjection air is terminated.

3 Claims, 3 Drawing Figures

PROCESS AND APPARATUS FOR AFTERBURNING OF COMBUSTIBLE POLLUTANTS FROM AN INTERNAL COMBUSTION ENGINE

This is a continuation of application Ser. No. 496,017 filed Aug. 7, 1974 now abandoned.

The present invention is related to improving the method and apparatus described in the specification of U.S. patent application Ser. No. 441517 (hereinafter called the main patent application), in order to:

On the one hand simplify and improve the automatization of the system which controls the secondary injection air to engine air intake ratio, and to adjust the distribution of secondary air between the preinjection and the reactor injection according to the engine operating conditions (r.p.m., power).

On the other hand, take advantage of this accurate control and distribution system in a two-stage combustion reactor, to achieve, after the preinjection step, a first combustion of the most reactive elements (hydrogen mainly), in order to get exhaust gases temperature and chemical composition which are most favorable to the reduction of nitrogen oxides on a catalyst.

According to the invention there is provided in a process for the afterburning of the combustible pollutants from an internal combustion engine according to the main patent application, the improvement comprising, in order to automatically reduce the secondary injection rate when power increases without using a controlling valve actuated by the carburettor venturi depression, providing a volumetric efficiency of the secondary air pump linked to and activated by the engine and a volumetric efficiency which decreases when the ratio between its back pressure and suction pressure increases, this reduction being achieved through the proper selection of the pump volumetric compression ratio $r$: between $0.6\,c$ and $1.3\,c$ when a steeply decreasing trend is required, and above $1.3\,c$ if a slower and slower decreasing trend is required.

The invention also provides an afterburner apparatus according to the main patent application, wherein a nitrogen oxide reducing catalyst is placed inside the afterburner reactor on the gas stream, immediately at the outlet of a torus, in which the gases are homogenized and their reaction with preinjection air is terminated.

By way of example, a specific embodiment in accordance with the invention will now be described with reference to the accompanying drawings in which.

Figure 1:
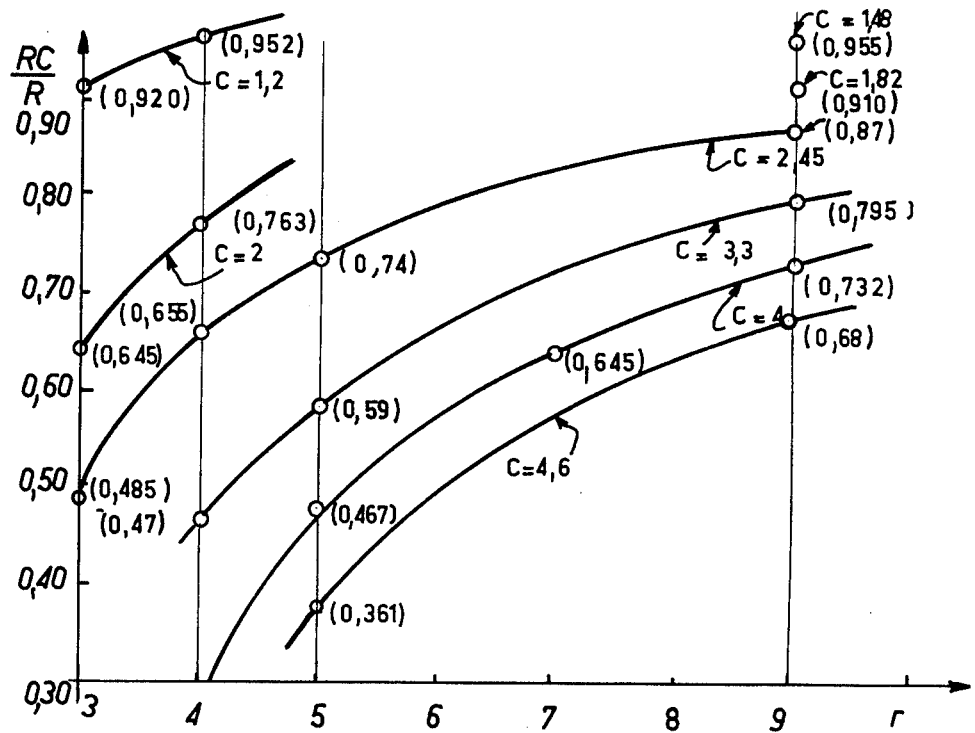
FIG. 1 is a set of curves representing the decrease of the volumetric ratio $Rc/R$ of an internal combustion engine or of a volumetric air pump, as a function of this compression ratio $r$, and of the ratio $c$ of the exhaust to the inlet pressure.

It is to be recalled that the main patent application describes a system and an apparatus which enables the achievement of a decreasing secondary air to engine air intake ratio, the decreasing effect resulting from the action of a pressure reducing valve subjected to the carburettor venturi suction, which is itself a function of the engine air intake. As it is known that the volumetric efficiency of a volumetric pump and of a piston engine varies within large limits with, on one hand, the volumetric compression ratio $r$ and, on the other hand, of the ratio $pr/pa$ of the outlet pressure $pr$ to the inlet pressure $pa$ of either the pump or the engine, it has been specified, in the main patent application, that the pump dead space should be such that approximately the same function of the displacement volume of the pump or of the engine is occupied, when expanded at the inlet pressure, by the residual air at the end of the compression for either the pump or the engine.

As the $pr/pa$ ratios of the engine and pump are different, and vary differently when the engine power varies, the pump volumetric compression ratio $r$ should also vary according to operating conditions, and the solution hereabove described, which is based on an average value of $r$, does not meet accurately the specified conditions. It could be improved by using a control system for the pump dead space, according to the power delivered by the engine.

The present invention is related to a simpler solution of the problem, which enables achieving the optimum result, in any operating conditions, without using the carburetor venturi suction, and which consists in adopting for the pump an appreciably lower volumetric compression ratio than for the engine and to establish it in accordance with the general decreasing relation of the secondary air injection to engine air intake ratio when the engine power increases, and the air fuel mixture gets leaner.

We shall describe, hereafter, first how to select the volumetric compression ratio of the pump, when the reducing valve controlled by the carburetor venturi suction is eliminated, and secondly how can be adapted to such a pump the control system through the intake manifold vacuum, which is described in the main patent application.

According to the main patent application, the exhaust pressure of the pump is 2.45 bars (absolute) for hot idling conditions (800 r.p.m.), and it is preferably limited to 3.3 bars (or 4 bars) at full power. Under these conditions, the absolute inlet and exhaust pressures and the $pr/pa$ ratio of the engine and the pump are the following:

| ENGINE OPERATING CONDITIONS | PRESSURE (BARS) | Pa | Pr | Pr/Pa | Rc/R |
|---|---|---|---|---|---|
| Hot Idle 800 rpm | Engine | 0.57 | 1.04 | 1.82 | 0.91 |
| | Pump | 1 | 2.45 | 2.45 | 0.74 |
| Full Power 3000 rpm | Engine | 0.87 | 1.28 | 1.48 | 0.955 |
| | Pump | 1 | 3.3 | 3.3 | 0.59 |
| | | 1 | 4 | 4 | 0.467 |

The above mentioned exhaust pressures of the engine include the back pressure of a normal muffler plus the supplementary resistance of an afterburner (about 0.10 bar).

It is known that the volumetric efficiency of a volumetric pump decreases more rapidly, when the ratio $pr/pa = c$ increases, as the pump compression ratio $r$ gets closer to $c$ and vice-versa.

It also applies to the engine considered as a volumetric pump during the period corresponding to filling the cylinder with sucked-in air. Assuming R designates the volumetric efficiency of either pump or engine, when $pr=pa$ and $Rc$ designates this same efficiency when $pr/pa>1$, it is possible to represent the decreasing relation of $Rc/R$ as a function of $r$ and $c$ by the family of curves network of FIG. 1.

As the air sucked-in either by the engine or by the pump is proportional to the product of r.p.m. by the absolute aspiration pressure and by $Rc/R$, i.e., the engine air intake = proportionality constant $x$ engine speed in rpm $\times$ aspiration pressure $\times$ $Rc/R$ it will be shown by the following examples first how the secondary air ratio decreases when the power increases, and secondly how this secondary air rate decrease is modified when the engine operates at full speed, and reduced power (demultiplication in gears, deceleration, descent, etc.).

EXAMPLE I

Assuming a volumetric compression ratio of 9 for the engine and 5 for the pump, if the engine air intake, at hot idle (800 r.p.m.) is designated by V, corresponding to an A/F (air/fuel) of 12.

V can be computed as follows from the formula $V = km \times rpm \times Pa \times Rc/R$ where $km$ is an engine proportionality constant:

$V = km \times 800 \times 0.57 \times 0.910 = km \times 414$

On the other hand, the pump with $pr/pa = 2.45$ and volumetric compression ratio $r = 5$ has its volumetric efficiency reduced to $Rc/R = 0.74$. As $V_{pump} = 0.36$ $V_{engine}$ at idle the pump must deliver $0.36 V = kp \times 800 \times 1 \times 0.74 = kp \times 592$ ($kp$ being a pump coefficient), it appears that $kp/km = 0.253$. At 3,000 r.p.m. and high engine power, the reducing coefficients $Rc/R$ of the engine and the pump are, respectively, 0.955 ($pr/pa = 1.48$) and 0.59 ($pr/pa = 3.3$) and their respective air throughputs are:

$V_{Engine} = km \times 3,000 \times 0.87 \times 0.955 = km \times 2,490$ $V_{Pump} = kp \times 3,000 \times 0.59 = kp \times 1,770$ or $0.253 \times kp \times 1,770$ Hence, the secondary air ratio:

$$\frac{V_{Pump\ Throughput}}{V_{Engine\ Throughput}} = \frac{1,770}{2,490} \times 0.253 = 0.179$$

i.e.: slightly less than one-half at hot idling conditions.

EXAMPLE II

A higher secondary air ratio can be achieved, by letting $pr/pa$ increase to 4 for instance. Then the reducing coefficient of the pump volumetric efficiency falls to 0.467 at full engine power, instead of 0.74 at hot idle, and the secondary air injection rate is reduced to 0.142, which is 0.39 times that at idle.

EXAMPLE III

In increasing to 4.5 bars (absolute) the maximum pressure ahead of the sonic injectors the reducing coefficient of the volumetric efficiency falls from 0.74 at idle to 0.379 at high power, and the secondary air rate is reduced to 11.5% or 0.32 times that at idle. This rate is normal for A/F of approximately 14 at high power.

A further advantage of increasing the maximum pressure to the sonic injectors is to boost their maximum output to $4.5/2.45 = 1.84$ times their idling output, thus to increase their share of the air injected at high power.

EXAMPLE IV

Cold start-up on choke is a special problem. In order to get an air injection rate of 45 percent on choke with A/F = 11.3 (these values are given in the main patent application table listing various secondary air injection rates against A/F ratio), it is possible to increase the ratio of the air pump throughput to the engine air intake through one or the other of the following solutions or in combining them:

Either boost the pump air suction pressure with the reactor cooling blower

Or supply air to the additional non-critical injection through a special valve actuated by the choke system, and reducing the air pressure to its idling value (about 2.45 bars abs).

It must be mentioned first that on fast idling (1,200 r.p.m.) with choke, the absolute air intake manifold of the engine is reduced, from 0.57 to 0.52 bars, for instance, and the engine volumetric efficiency is reduced by about 1 percent, which leads to a total reduction of its air intake of $$\frac{0.52}{0.57} \times 0.99 = 0.90$$

Hence, in order to increase the secondary air ratio of 36 percent to 45 percent, it is sufficient to increase the air pump throughput by $0.90 \times 0.45 = 0.405$ (instead of 0.36) of the engine air intake at 1,200 r.p.m. and constant manifold pressure.

The pressure booster does not modify the ratio $pr/pa$ when pumping air through critical orifices because their admission pressure is proportional to their throughput. It is thus sufficient to boost the pump suction pressure to $0.405/0.36 = 1.12$ bar, which is a 0.12 bar or 12% booster increase, in order to achieve a secondary air rate of 45 percent of the air engine intake.

On the other hand, if one wants to inject more air through non-critical orifices, it is sufficient to decrease $pr/pa$ at 1,200 r.p.m., by means of a pressure controlling valve, to a value which corresponds to a 12 percent increase (relative) of the pump volumetric efficiency, the supplementary airflow being delivered through this reducing valve to the non-critical orifices.

It is also possible to combine these two solutions in order to reduce the exhaust pressure of the cooling blower or low pressure pump, when used as a booster. It is to be mentioned that during the cold start-up, with the cooling blower or low pressure pump operating as booster, the cooling airflow to the reactor is suppressed, which is readily acceptable under these conditions.

The systems hereabove described, and preferably the second, can advantageously be put in operation, during quick vehicle acceleration, by the same mechanism which injects temporarily more fuel (for instance, an auxiliary fuel pump), and thus enable increase of the air injection ratio in order to burn the excess of unburnt pollutants, resulting from this excess fuel.

EXAMPLE V

The method, hereabove described, for automatically reducing the secondary air ratio when the engine power increases would equally apply to lower injection pressures than those corresponding to critical air flow. For instance, FIG. 1 shows that for an air pump with a volumetric compression ratio $r = 3$, the reduction of its volumetric efficiency $Rc/R$ varies from 0.920 for $c = 1.2$ to 0.645 for $c = 2$, this latter value being the maximum pressure elevation of commercial low pressure air pumps.

EXAMPLE VI

When the engine is used with higher gear ratios, the maximum r.p.m. can be obtained at a fraction only of the engine maximum power.

This happens similarly when the vehicle is going downhill, or is decelerating (engine braking).

Despite the fact that the carburetor delivers, under such conditions, a richer mixture than at full power, the air pump, driven at maximum speed will deliver an excessive air output which can introduce some troubles, such as excessive gases quenching and reactor blow-off, or oxidizing mixture after preinjection, or in contrast "fire" in the reactor in case of misfiring of one or more spark plugs.

Such troubles can be eliminated by using, according to the main patent application, a control system for reducing the pump suction pressure, but it needs to be adapted to an air pump whose volumetric efficiency decreases rapidly when $pr/pa = c$ increases, as described above.

We shall describe hereafter some examples of such an adaptation to engine operating conditions in low or high gear with demultiplication in gear in the ratio of 1.5/1, for instance, and with equal power delivered by the engine, either at 2,000 r.p.m., with 0.844 bar intake pressure, or 3,000 r.p.m. with 0.587 bars intake pressure. As indicated on the following table, the engine air intake is then equal to 64.5 percent of air intake at full power and speed.

Under these conditions, the exhaust back pressure is above 1.16 bars (absolute).

The following table also shows the elements for the computation of the air pump throughput, or when its suction pressure is either equal to atmospheric pressure or reduced to a lower value.

It is evident from the above table that a minor reduction of the suction pressure can provide a considerable decrease of the air pump output, mainly because, over and above the air density decreases, there is added the relatively more important effect of the pump volumetric efficiency decrease.

It appears that in the example selected, and especially with a pump compression ratio $r = 5$, the required result is achieved when its suction pressure is controlled at $0.870/0.587 = 1.48$ times approximately the absolute pressure at the engine intake manifold. Therefore, the actuating mechanism of the pressure reducing valve must be controlled by this last pressure. It can be achieved, for instance, by modifying the valve described in the main patent application in such a manner that it is actuated by two opposed pistons, one of which is connected with the engine intake manifold, and the other connected with the pump suction, but having a section of approximately 1.5 times the section of the former.

According to such control, the reducing valve will remain wide open, as long as the engine intake manifold absolute pressure is higher than 0.7 bars (approx.), which corresponds when operating in gear with 1.5/1 ratio, to about 80 percent of the engine maximum power. The proposed control will achieve a secondary air rate of approximately 14 to 15 percent up to this power fraction. In case of full power demand (uphill operation, or acceleration, the air injection ratio is 14.2 percent, as in Example II).

On the other hand, on account of the idling on choke mixture richness, the reducing valve must be kept open when the transmission is in neutral, or when the engine clutch is disengaged and, generally speaking, for all speeds lower than 1,500 r.p.m. This can be achieved through the action of an engine speed detector, such as a centrifugal controller.

The above table also shows that, during deceleration at high speed (3,000 r.p.m., 0.38 bar absolute intake pressure), the above described control system would reduce the pump suction pressure down to 0.562 bars, and maintain an air injection rate of about 17 percent, which enables avoiding undue reactor overheating, at the beginning of the deceleration period, during which the air fuel mixture is suddenly enriched by the quick drying up of the intake manifold. By the same token, a protection against oxidation and excessive temperatures would be afforded to a nitrogen oxide reducing catalyst placed in the reactor after air preinjection to the engine exhaust ports. The immediate protection thus achieved in such conditions is much faster than that of prior art systems, based on the action of thermocouples placed in the reactor.

Evidently, the above examples do not constitute a limitation of the invention, and the control system can be extended to different conditions and especially to different maximum values of the $c$ pressure ratio, with a proper selection of the pump compression ratio $r$. More generally, the pump volumetric efficiency decrease is all the more rapid that $r$ is lower, its minimum value corresponding evidently to a zero output. For instance, for a $c$ pressure ratio of 6.6, a zero volumetric efficiency is obtained at a pump compression ratio of 5 (in the assumption of an adiabatic operation of the pump), and for a $c$ pressure ratio of 3, zero efficiency is obtained at a compression ratio $r$ of 1.8 approximately. The normal values of $c$ being comprised between 2 and 5, there is thus ample leeway for realizing the required decrease relation of the pump volumetric efficiency.

In practice, the $r$ ratio will be selected between $0.6\,c$ and $1.3\,c$ when a rapidly decreasing trend is preferred, and above $1.3\,c$ when a progressively slower trend is required for the pump volumetric efficiency.

| R.P.M. | GEAR NO | Pa (BARS) | Pr=c / Pa | Rc / R | AIR OUTPUT | SECONDARY AIR INJECTION RATE % |
|---|---|---|---|---|---|---|
| 2000 | 4 | 0.844 | 1.38 | 0.96 | 2000×0.844×0.96×km=1610 km | |
| 3000 | 3 | 0.587 | 1.98 | 0.91 | 3000×0.587×0.91×km=1605 km | |
| 3000 | 4 | 0.870 | 1.48 | 0.955 | 3000×0.87×0.955×km=2490 km | |
| 3000 | 4 | 0.380 | 2.63 | 0.854 | 3000×0.38×0.854×km=1005 km | deceleration |
| 800 | — | 0.570 | 1.82 | 0.910 | 800×0.57×0.91×km=414 km | hot/idle |
| 2000 | 4 | 1 | 4 | 0.467 | 2000×0.467×0.253×km=236 km | 14.7 |
| 3000 | 3 | 1 | 4 | 0.467 | 3000×0.467×0.253×km=359 km | 22.3 |
| 3000 | 3 | 0.870 | 4.6 | 1 | 3000×0.87×0.361×0.253km=238 km | 14.8 |
| 3000 | 4 | 0.562 | 4.53 | 0.371 | 3000×0.562×0.41×0.253km=174 km | 17 |
| 800 | — | 1 | 2.45 | 0.74 | 800×1×0.74×0.253km=149 km | 36 |

Figure 2:
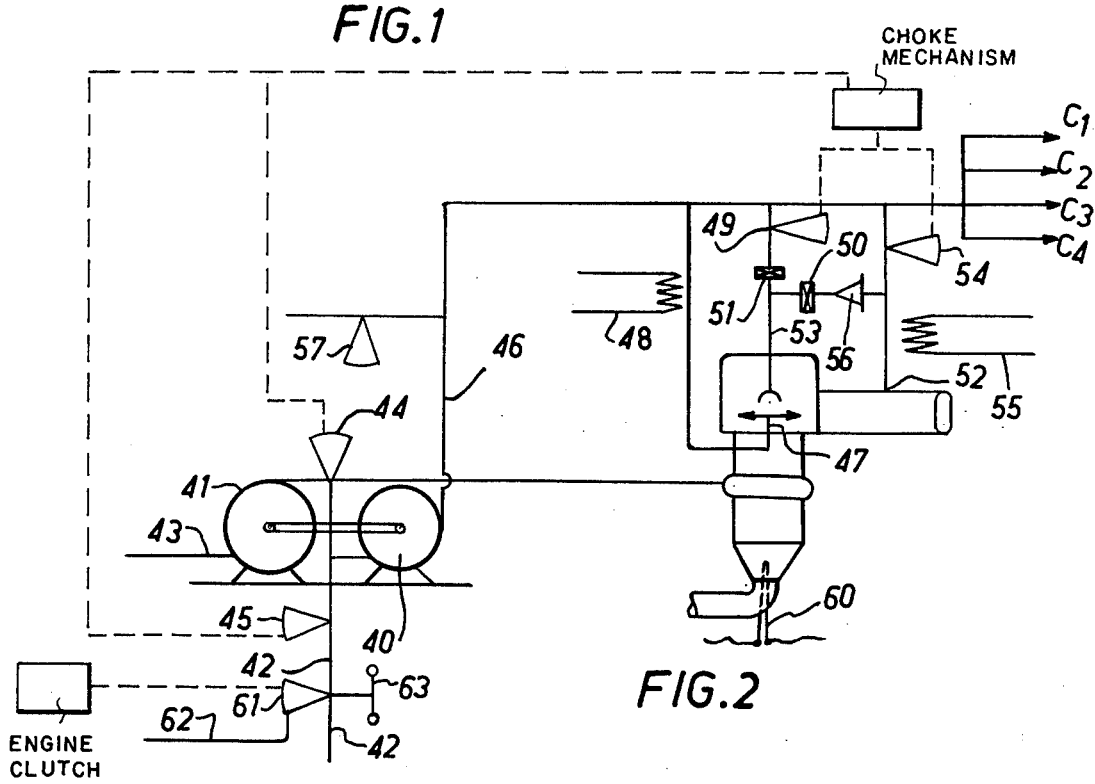
FIG. 2 is a schematic flow diagram showing the air feed to the engine cylinder exhausts and into the combined afterburning and reducing reactor.

With reference to FIG. 2 of the attached drawings, a detailed description of the control system will be given. The air pump 40, 41 and the blower or low pressure pump, both mechanically driven by the engine, have independent suction inlets at atmospheric pressure, respectively, through lines 42 and 43. During choked operation, the blower as low pressure pump output can be sent to the pump suction, through a three-way valve 44 actuated by the choke mechanism, while the normal pump suction line is closed by valve 45, simultaneously actuated by the choke mechanism.

High pressure air is fed through line 46 to the injector resonators cylinders $C_1$ to $C_4$, as well as to the reactor injector 47, this latter air injection being heated by the electrical heater 48, under the conditions described in the main patent application.

The air feed of the orifices is supplied at full power through the pressure controlling valve 49 which opens at maximum pressure of 3.3 to 4.5 bars (absolute), for instance, the air flow being distributed between the nozzle 52 and the central injector 53 through calibrated orifices 50 and 51.

During choked operation, the valve 49 remains closed and air is sent into nozzle 52 through the pressure controlling valve 54, which is set at the required pressure, and is actuated by the choke mechanism, the air flow being eventually heated by the electric heater 55. A one-way block valve 56 prevents air flow back into line 53.

The flow restricting valve 61 enables reduction of the suction pressure of the air pump 40 in proportion to the absolute pressure decrease at the intake manifold, to which it is connected by a detecting line 62. The valve 61 can be blocked open under the action of an engine speed detector 63, such as a centrifugal controller or when the clutch is disengaged, such action being important at very low engine speed, and especially during hot idle or cold start-on choke.

To summarize, it appears that all the various automatic systems for controlling secondary air injection rates, described above and in the main patent application, enable meeting all practical requirements. The automatic and accurate control of the air injection ratio is of the utmost importance, for a satisfactory performance of afterburner reactors, whether thermal or catalytic, and the solutions hereabove proposed apply to both types of reactors.

In the case of reactors including a nitrogen oxide reducing catalyst which receives, as generally provided, a gas flow from a preoxidation step (thermal or catalytic) and after which the unburnt pollutants are further minimized in a final oxidation step, it is especially important to adjust the air preinjection with great accuracy, in order to get a strongly reducing gas mixture and, above all, to consume all of the preinjected air. Effectively, the requirements of a nitrogen oxide reduction catalyst for a correct operation are:

a sufficiently high gas temperature (which necessitates a sufficient combustion amount).

a combustion amount limited to the required temperature.

a residual oxygen amount practically reduced to zero, which necessitates excellent air and gas mixing during the combustion.

I shall now explain how the two combustion stage reactor described in the main patent application, lends itself advantageously, to achieving the gas temperatures and chemical composition required for the optimum performance of reducing catalyst in general, and how this type of reactor can include a catalytic converter, after minor modifications.

In order to realize a minimum operating temperature for the catalyst which is around 1,400° F, it is required:

on the one hand, to reheat the exhaust gases through a limited precombustion step, and with the most thorough mixing possible of air in gases, in order to minimize the residual oxygen content of the gases at the inlet of the catalyst.

on the other hand, to accurately adjust such air injection to the minimum necessary to achieving, under all operating conditions the highest possible content of CO and other unburnt pollutants at the inlet of the reducing bed.

These two requirements are met by using the two stage precombustion system described in the main patent application; a first combustion stage at the injector-resonators in the exhaust ports and a second combustion stage behind the torus annular dam, together with the air injection control systems and equipment described in the main patent application.

In a 4-cycle engine, the exhaust valve opens during only one-third or one-fourth of the time and when it pops up, it produces a strong pressure burst in the exhaust manifold which overcomes the air flow delivered by a low pressure air pump. Consequently, air and gas mixing does not take place during the exhaust flow pulsation, but only before or after, and the flow in the exhaust piping consists mostly of separate air and gas slugs.

On the contrary, when air is injected through an ultrasonic injector, and at an inlet pressure at least greater than twice the manifold maximum pressure, when the exhaust valve is open, as specified in the main patent application, an effective air and gas mixing occurs during this period. Furthermore, stationary sonic waves enhance thorough mixing and oxidation of high temperature exhaust gases which still contain part of the radicals formed in the engine. The most favorable conditions are, therefore, realized for effecting a first combustion step behind the air injection, and specially along the recirculation wake behind the injector-resonators. However, this first combustion can only use about one-third of the available air because the remaining air is injected when the exhaust valve is closed.

This fraction of the air can react, to some extent, with gases coming from other cylinders, at the intersection of the different streams. Nevertheless, the homogenizing system, according to the main patent application, and with the annular dam or other stabilizing bluff-body, according to the main patent application has a most important function which can be explained as follows:

The path during which air and gases mix together is extended through the torus on account of its axial length and of gas tangential velocities of the order of 40 to 100 m/s with axial velocity of about 10 to 25 m/s. As a consequence, the gas can, before reaching the annular dam, follow a helicoidal trajectory corresponding to one complete revolution, and to cover about 40 centimeters more distance if the torus mean diameter is 13 centimeters.

Moreover, the intense mixture centrifugation pushes toward the center of the torus this fraction of the gases which has already burned at the injectors, and reduces the dilution of the cooler mixture which travels at the torus periphery. It is thus possible to avoid partially the reaction rate decrease by its own products.

The mixture which flows near the annular dam is consequently as reactive as possible and a combustion zone can establish itself downstream of this dam. As the gases continue their fast gyration and thanks to the extraction of burned gases toward the center, the torus periphery remains preferentially supplied with oxygen and combustible gases. The minimum oxygen dilution thus achieved to which a centrifugal pressure increase is added, helps to achieve a residual oxygen contact lower than with any prior design system. It provides a higher catalytic activity, which enables reduction of the operating temperature, and as a consequence, reduction of the engine air fuel mixture richness, and hence reduction of the fuel consumption.

In order to positively ignite the gases downstream of the dam, it is preferred to use a hot spot or a spark plug before or after the annular dam or any other bluff-body. The damaging effect of heat on this device will be negligible, because air preinjection control only allows a very partial combustion, corresponding to the minimum temperature required by the reduction catalyst, which itself is diminished as the residual oxygen content is lowered. Normally, this temperature must vary between 1,350° and 1,500° F, and it does not lead to an objectionable deterioration of the ignition device or the torus materials.

The annular dam can be replaced by any other obstacle or bluff-body such as wedge, cylindrical rod perpendicular to the flow together with a hot point or spark plug near the obstacle and specially near the corresponding recirculation wake.

Figure 3:
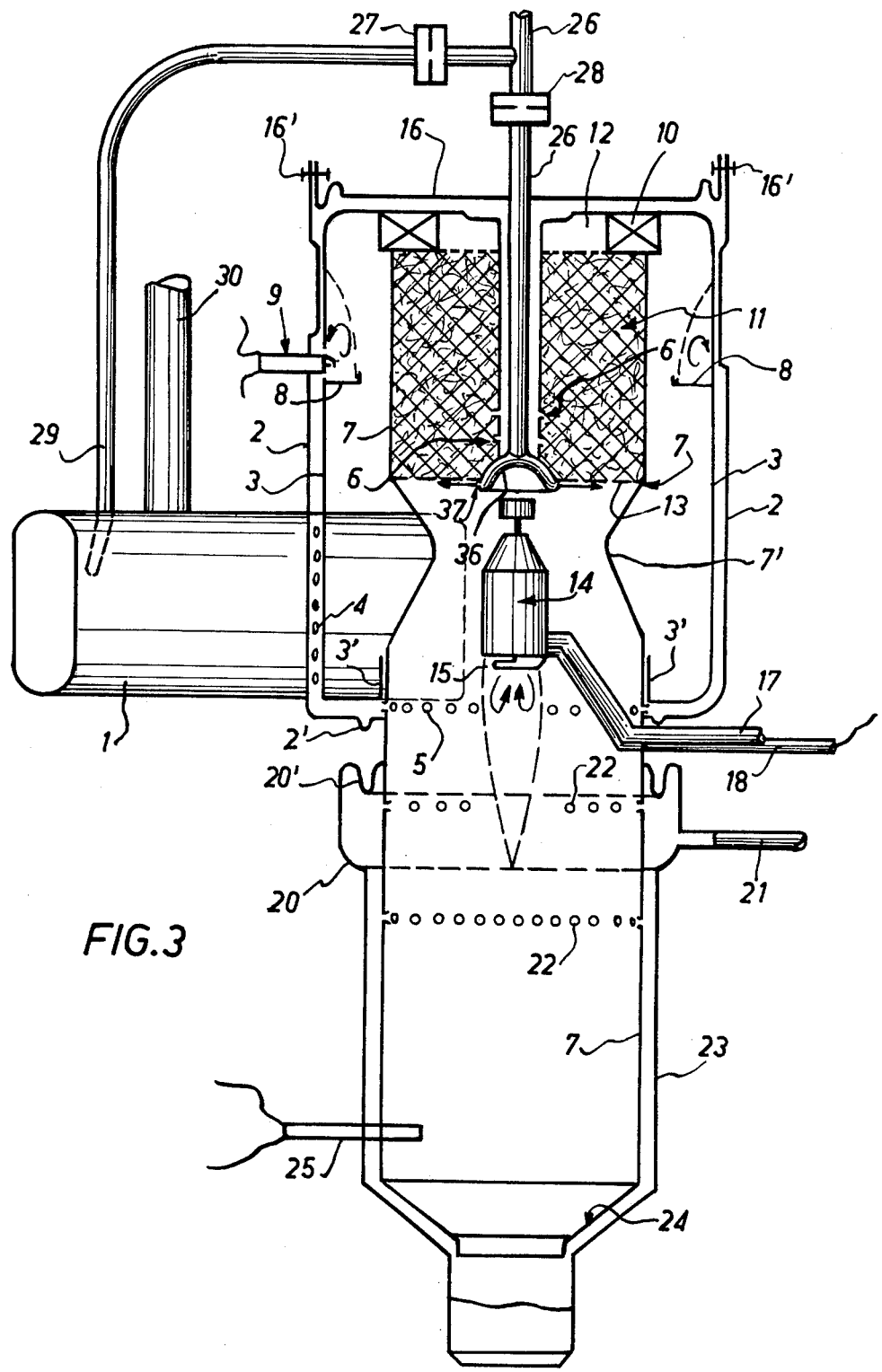
FIG. 3 is a schematic view of such a combined afterburning and reducing reactor.

FIG. 3 represents a complete reactor for thermally afterburning the combustible pollutants, and for catalytically reducing nitrogen oxides.

This reactor is supplied from the exhaust pipes of the various engine cylinders, with gases mixed with part of the air, which in the present example enters the reactor through a single nozzle 1, (a two nozzle design is described in the main patent application) with rather flat section, and which ends tangentially in a double shell torus, an outer shell 2, and an inner shell 3, the volume between the two shells being connected with nozzle 1 by means of orifices 4 which are drilled in the nozzle wall and/or by means of a sufficient gap at the intersection of nozzle 1 with the inner shell 3.

As the inner shell 3 can be much thinner than the outer shell 3, its heat-sink effect is much lower, and the gas cooling during start-up is reduced. Furthermore, a fraction of the order of 5 to 15 percent is withdrawn from the main gas stream, and flows between the two torus shells until it is expelled, after having been cooled by external losses, through orifices 5 and 6 whose location will be indicated later.

Inside of the torus, and coaxial to it, is placed the reactor body 7, which consists of two cylindrical or conical elements, connected together by a convergent-divergent nozzle 7'. The main gas stream (85 to 95 percent of the total) acquires, after entering into the torus a high tangential velocity (40 to 100 m/s) and a relatively low axial velocity (10 to 25 m/s).

This gas stream can thus pick up a very high gyration momentum (from about 6,000 to 15,000 r.p.m.) according to the diameter of the torus inner shell. After having accomplished at least one revolution around the axis, this gas stream hits a 10 to 15 mm high annular dam 8 (in the present example), which determines the formation downstream of a recirculation zone, with an axial length of 30 to 35 mm., which is fed preferentially by gases and air which have not burned behind the exhaust ports injectors, and are relatively cooler. The composition of this mixture, which is not diluted by hot burnt gases is favorable to combustion.

Its ignition can be triggered with a spark plug 9, with its head flush with the inner shell 3, if possible, and sheltered by the annular dam 8. The axial velocity in the torus section which is restricted by the dam is about 20 to 40 m/s. locally. The gas stream flows thereafter to the inlet of the reactor body 7 through an annular grid of straightening vanes 10, which are described in the main patent application. The height of vanes corresponds to a gas radical velocity of 30 to 50 m/s. However, this grid can be eliminated if the catalyst is able to dampen the gas gyration without being damaged.

The gases then contact a nitrogen oxide reducing catalytic bed 11 consisting of nickel and copper alloy (Monel type) Swarf, Raschig rings, grids and other contacting elements. In order to keep the pressure drop in the catalyst bed under a reasonable limit, the diameter of the reactor shell 7 is such that the function of the axial gases velocity is less than 15 to 20 m/s. The catalyst is contained by grids or supports with ample perforations 12 and 13 the grid or support 13 being placed at the convergent portion of nozzle 7' with the reactor shell and letting the gases flow around an injector-resonator 14, coaxial with the reactor and of the configuration described in the main patent application.

The injector resonator 14 facilitates the combustion of the rest of the combustible pollutants, by stabilizing a flame along the reactor axis, the injection being triggered, especially during cold start-up, by the hot wire 15, which is otherwise used, under the circumstances described in the main patent application. The grid 13 can be equipped with vanes susceptible of imparting some swirl to the gases, if it is useful to shorten the circulation wake, behind the axial injector resonator body. The pressure drop, caused by the catalytic bed, dampens gas flow pulsations, and enhances the flame anchoring downstream of the injector body 14. Furthermore, this pressure drop can be compensated by a reduction of the muffler resistance, for the same acoustic level at the car exhaust.

The injector-resonator 14 is equipped with a double shell parabolic reflector 36, which bounces sonic waves downstream, its back end being in the plane of the grid 13. The fraction of the secondary air which is not used by the injector resonator 14 flows inside of the reflector 36 double shell, and is exhausted through the orifices 37 at a high velocity (50 m/s minimum) from the center to the periphery and parallel to the plane of grid 3. As will be indicated hereunder, the reflector 36 is supplied with air through line 26.

The injector-resonator 14 is very close to the grid or support 13, so as to be as far as possible from the gas flow velocity pulsation nodes existing in the empty part of the reactor. The resonator is located appreciably ahead of the throat of the convergent-divergent nozzle 7' so as to be inside a high velocity (20 to 30 m/s) convergent stream of gases coming out of the catalyst bed. Moreover, this position of the resonator enables the convergent nozzle portion to reflect, toward the catalyst bed, the sonic waves which have not been caught by the reflector, hence minimizing contamination of the catalyst by deposits.

The gases flowing inside of the torus double shell, in order to carry away some external thermal losses, are recycled to the reactor partly through orifices 5 downstream of the central flame anchoring, and partly through orifices 6 in the second half of the catalytic bed, which is heated by the upstream reduction reaction. Thus, in both instances, the injection of cooled gases does not appreciably hamper either the combustion or the reduction.

As the high gyration momentum of the gases in the torus causes the centrifugation of the largest lead and other particulates, the outer shell head 16 of the torus is removable, and includes a flexible annular corrugation which reduces strain on the bolts 16'. It also provides the possibility of removing the inner shell 3, which slides on the reactor shell 7 by the collar 3', with a clearance decreasing with temperature, which provides a sufficient tightness at high temperatures between the two elements. The spark plug 9, screwed in the outer shell 2, is removable. At its intersection with the inner shell 3 there is provided a sufficient clearance to take care of unequal thermal expansion between shells 2 and 3.

The injector resonator 14 is supplied with high pressure air through line 17, and the hot wire 15 is supplied with power through the ceramic isolated cable 18.

The rest of the reactor is in accordance with the main patent application, i.e., the inner shell 7 ends either with a conical head 24, or with a spiral casing with a refractory shield, as represented in FIG. 6 of the main patent application.

The thermocouple 25, inside of the exhaust pipe is also described in the main patent application.

Low pressure air is injected into the flexible torus 20 through line 21 in order to cool the cone 24, cool the double shell and eventually feed a cooler boundary layer inside of shell 7, through orifices 22 or by means of a sufficient porosity of the inner shell 7. The corrugation of the flexible torus compensates differential expansions between the inner and outer shells. In the example selected, the gas flow amounts to 127 lit/s at the engine exhaust and to 140 lit/s at the torus outlet and at the reactor inlet 7. With an inner diameter of 100 mm., the axial velocity is about 18 m/s (empty reactor). Assuming a 12 mm. gap between the dam and shell 7, the axial velocity in the torus restricted section is about 26 m/s. The section of nozzle 1 at its intersection with the torus is 13 cm$^2$ for a 100 m/s outlet velocity, its possible dimensions being, for instance, 70 × 18.5 mm. or 50 × 26 mm. approximately. The gases gyration corresponds to about 15,000 r.p.m.

In order to relieve the stresses caused by differential thermal expansion between the various shells 2, 3, 7 and 23, flexible corrugations are provided at 2' (between 2 and 7) and at 20' (between 7 and 23). The line 26 feeds the reactor with additional air when the output of the various injector resonators is insufficient. This additional air is divided by the calibrated orifices 27 and 28 between line 29, which supplies nozzle 1, and line 26 which supplies orifices 37 in a ratio which can be different from the exhaust ports to reactor sonic injectors output ratio. It is thus possible to achieve different air injection rates before and after the catalyst, and therefore to supply it, especially at full power, with the most reducing stream of gases and with the lowest oxygen residual content. The line 30 connects the reactor with a pulsation dampener of the volume resonator type (not represented on FIG. 3).

Certain parts of the equipment are especially subjected to high temperatures, namely: the torus inner shell 3, downstream of the dam 8 and the cone 24. These parts must be built with refractory steels, or with ceramic or with ceramic and metal composite materials.

Among the ceramics, the CER-VIT manufactured by Owens Illinois can be employed. It is easy to install such a cylindrical ceramic shield downstream of the dam 8. The clearance between this ceramic shield and the metallic shell 3 will increase with temperature, but will not induce dangerous vibrations. The straightening vanes grid 10 can be cast from ceramic.

I claim:

1. A process for the afterburning of the combustible pollutants from an internal combustion engine wherein secondary air is introduced into the engine exhaust gases, the secondary air being introduced in an amount in relation to primary combustion air drawn into the engine inlet to form a secondary air injection ratio, the improvement comprising, reducing the secondary air ratio when the engine power increases, independently of the engine carburettor venturi suction, by pumping secondary air into the engine with a volumetric efficiency which decreases when, as a consequence of increase of engine power and exhaust gas flow, the ratio $c$ of the pressure of pumped air to the inlet air pressure also increases, said volumetric efficiency decrease being obtained by maintaining a volumetric compression ratio of the pumped air between 1 and 1.5 times the ratio $c$ for a pumping operation when the engine is running at maximum speed and load.

2. A process according to claim 1, comprising maintaining the secondary air ratio in a given range when the engine is operated at high speed, by restricting the inlet of pumped air by means of a throttling valve, actuated by a suction pressure controller, which keeps the absolute pressure of the inlet pumped air between 1.2 and 1.5 times the absolute pressure in the engine intake manifold, the throttling valve being kept open when the transmission is in neutral, when the engine speed is lower than 1500 rpm, and when the engine is operated with the choke activated.

3. A process according to claim 1, comprising increasing the secondary air injection ratio during startup on choke and during acceleration by directing air from a cooling blower to the air to be pumped thereby increasing air inlet pressure.

* * * * *